Sept. 13, 1927.

F. GOUVION 1,642,302

LIQUID DISTRIBUTING APPARATUS

Original Filed Jan. 24, 1923

Inventor
Franz Gouvion
By— B. Singer
Atty.

Patented Sept. 13, 1927.

1,642,302

UNITED STATES PATENT OFFICE.

FRANZ GOUVION, OF BRUSSELS, BELGIUM.

LIQUID-DISTRIBUTING APPARATUS.

Original application filed January 24, 1923, Serial No. 614,706, and in Belgium January 24, 1922. Divided and this application filed October 19, 1925. Serial No. 63,504.

This invention relates to apparatus for delivering liquids in measured quantities by volume in which any suitable liquid is exactly measured whatever may be its density by the utilization of two measuring vessels, the level of liquid in the said vessels being determined absolutely by an overflow pipe through which excess liquid is returned to the supply reservoir and the air under pressure, which escapes from the one vessel which is being filled is used, for accelerating the discharge of the other vessel.

The present invention is a divisional application of applicant's copending application for Letters Patent of the United States for "Liquid distributing apparatus" filed Jan. 24, 1923, Ser. 614,706.

An apparatus as above stated has been described in this copending application Ser. 614,706 each vessel being surmounted by a sighting glass chamber from which the overflow tube starts.

According to the present invention the measuring vessel proper is connected to a chamber enclosing the end of the overflow pipe by two apertures formed in a separating partition one of the holes being of very small cross section whilst the other is of larger section and is adapted to be closed automatically by a valve at the moment the vessel is entirely filled with liquid.

If a single hole of small diameter only were provided the entrance and escape of air into and from the vessels would delay the filling and discharging of the latter and would consequently reduce the speed of distribution of the apparatus.

When the measuring vessel proper is completely filled the hole of small section ensures by itself the passage of air expelled during the filling of this vessel and subsequently the passage of the liquid which rises into the sighting chamber to pass into the overflow pipe.

This latter chamber which is fed by a hole of small section may thus be of very small capacity so that the volume of the overflow is itself reduced and as a consequence the overflow collecting chamber may be much smaller while the size of the pipe which leads to the reservoir may be particularly reduced.

By this means unnecessary pumping of a large quantity of liquid to be returned to the reservoir is avoided.

A large hole is nevertheless provided for the passage of the air from one vessel to the other and as the capacity of the overflow chamber which is common to both vessels, may be reduced, the volume of the deleterious space between the two latter is reduced by this fact alone so that the air passing from the vessel which is being filled to the gauge vessel which is being emptied is transmitted with greater rapidity and intensity by reason of the diminution of the deleterious space.

One form of construction of the apparatus incorporating the present improvement will be found illustrated as an example in the accompanying drawings, in which:—

Figure 1:
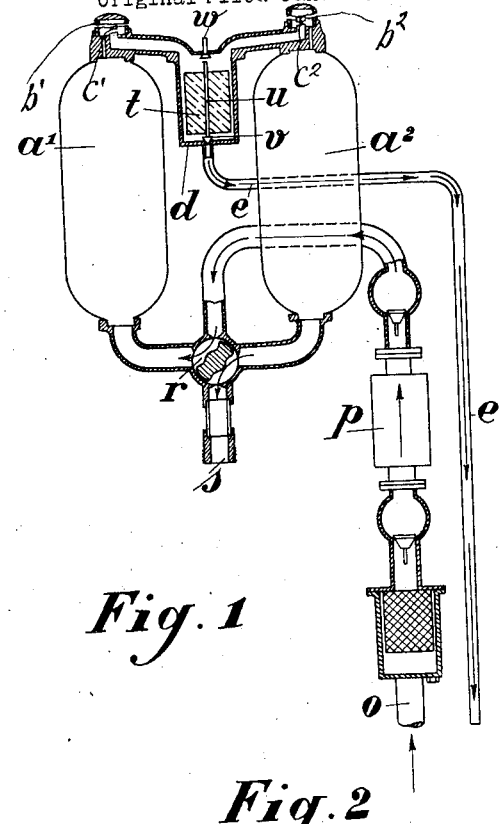
Fig. 1 is a sectional side view of a measuring and distributing apparatus having two measuring vessels.
Figure 2:
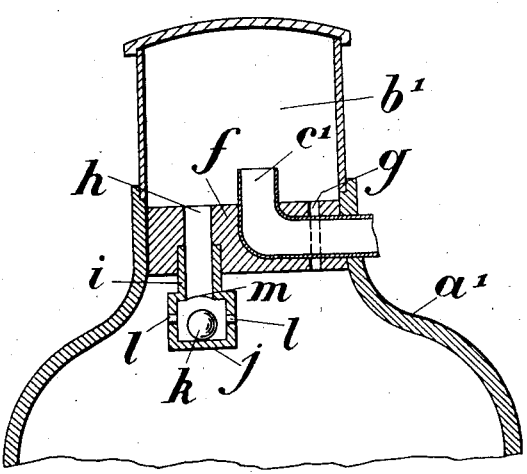
Fig. 2 is a view in vertical section showing diagrammatically the two passages which form connection between the measuring vessel $a_1$ proper and the upper chamber containing the overflow pipe.

The two vessels $a_1$ $A_2$ are surmounted by overflow chambers $b_1$ $b_2$ having overflow pipes $c_1$ $c_2$ connecting with the common overflow collector $d$ whence the excess liquid is returned to the main reservoir by the pipe $e$.

The partition $f$ which separates each vessel from its overflow chamber is formed with an aperture $g$ of small cross section and an aperture $h$ of much larger cross section, the latter hole being continued below the partition by a short pipe $i$ provided with a box $j$ containing a ball valve $k$. This valve box has lateral holes $l$ and further forms a spherical seat $m$ for the ball valve $k$.

The operation of the arrangement above described will be easily understood and is as follows.

When the vessel $a_1$ is filled the air escapes therefrom practically without resistance by reason of the large size of the hole $h$; the liquid which rises rapidly enters the box $j$ and lifts the ball valve $k$ which is thus pressed on its seal $m$ and closes the hole $h$ on the completion of the filling.

The impetus of the rising liquid accelerates its passage through the small hole $g$ and causes it to rise very rapidly above the level of the overflow pipe $c_1$ owing to the very small capacity of the overflow chamber $b_1$.

As soon as the discharge of the vessel $a_1$ commences, the valve $k$ leaves its seat $m$ and the air forced out by the filling of the vessel $a_2$ can easily pass through the large hole $h$ in order to cause a rapid discharge.

What I claim is:

Liquid measuring and distributing apparatus comprising a pair of measuring receptacles, means to supply them alternately with liquid, an overflow duct leading from each of said receptacles, an excess liquid receiving receptacle into which said ducts discharge, said ducts so establishing pneumatic communication between the said measuring receptacles so that air is caused to pass between said measuring receptacles while they are alternately filled and emptied, and a duct for the discharge of liquid from said excess liquid receiving receptacle, each of said measuring receptacles having an overflow chamber at its upper end into which the intake end of the overflow duct extends, and also having a partition separating said chamber from said receptacle, said partition having a relatively small opening establishing communication between said chamber and the receptacle and also having a relatively large opening also establishing communication between them, and a float valve active to close said large opening a short time before the liquid in the measuring receptacle reaches the said partition.

In witness whereof I affix my signature.

FRANZ GOUVION.